US010760030B2

(12) United States Patent
Takane et al.

(10) Patent No.: US 10,760,030 B2
(45) Date of Patent: Sep. 1, 2020

(54) GREASE

(71) Applicant: IDEMITSU KOSAN CO., LTD., Chiyoda-ku (JP)

(72) Inventors: Kouji Takane, Ichihara (JP); Tsukasa Yamagishi, Nagoya (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/022,129

(22) PCT Filed: Sep. 17, 2014

(86) PCT No.: PCT/JP2014/074499
§ 371 (c)(1),
(2) Date: Mar. 15, 2016

(87) PCT Pub. No.: WO2015/041227
PCT Pub. Date: Mar. 26, 2015

(65) Prior Publication Data
US 2016/0237374 A1    Aug. 18, 2016

(30) Foreign Application Priority Data
Sep. 18, 2013 (JP) ................. 2013-192833

(51) Int. Cl.
| | | |
|---|---|---|
| *C10M 169/04* | (2006.01) | |
| *C10M 107/38* | (2006.01) | |
| *C10M 125/10* | (2006.01) | |
| *C10M 125/24* | (2006.01) | |
| *F16C 33/66* | (2006.01) | |
| *C10N 30/06* | (2006.01) | |
| *C10N 30/08* | (2006.01) | |
| *C10N 30/00* | (2006.01) | |
| *C10N 40/02* | (2006.01) | |
| *C10N 40/04* | (2006.01) | |
| *C10N 50/10* | (2006.01) | |
| *C10N 10/02* | (2006.01) | |
| *C10N 10/12* | (2006.01) | |
| *C10N 30/12* | (2006.01) | |

(52) U.S. Cl.
CPC ........ *C10M 169/04* (2013.01); *C10M 107/38* (2013.01); *C10M 125/10* (2013.01); *C10M 125/24* (2013.01); *C10M 2201/062* (2013.01); *C10M 2201/084* (2013.01); *C10M 2201/085* (2013.01); *C10M 2201/087* (2013.01); *C10M 2201/10* (2013.01); *C10M 2211/003* (2013.01); *C10M 2211/0406* (2013.01); *C10M 2213/003* (2013.01); *C10M 2213/06* (2013.01); *C10M 2213/0606* (2013.01); *C10N 2010/02* (2013.01); *C10N 2010/12* (2013.01); *C10N 2030/06* (2013.01); *C10N 2030/08* (2013.01); *C10N 2030/12* (2013.01); *C10N 2030/64* (2020.05); *C10N 2040/02* (2013.01); *C10N 2040/04* (2013.01); *C10N 2050/10* (2013.01); *F16C 33/6633* (2013.01)

(58) Field of Classification Search
CPC .. C10M 69/04; C10M 125/10; C10M 107/38; C10M 125/24; C10M 2213/06; C10M 2201/062; C10M 2201/085; C10N 2010/02; C10N 2230/08; C10N 2010/12; C10N 2230/12; C10N 2030/12
See application file for complete search history.

(56) References Cited

U.S. PATENT DOCUMENTS

| | | | |
|---|---|---|---|
| 3,850,823 A * | 11/1974 | Kjonaas | C10M 5/00 252/389.5 |
| 2003/0013617 A1 * | 1/2003 | Howell | C10M 169/02 508/180 |
| 2009/0221457 A1 | 9/2009 | Ikezawa | |
| 2009/0325827 A1 | 12/2009 | Matsubara et al. | |
| 2010/0105586 A1 | 4/2010 | Bodesheim et al. | |
| 2010/0256027 A1 | 10/2010 | Miyamoto et al. | |
| 2011/0148064 A1 | 6/2011 | Yanase et al. | |
| 2014/0038863 A1 | 2/2014 | Kamata et al. | |

FOREIGN PATENT DOCUMENTS

| | | | |
|---|---|---|---|
| CN | 101679899 A | 3/2010 | |
| CN | 103275790 A | 9/2013 | |
| GB | 758493 A * | 10/1956 | .............. C10M 5/00 |
| JP | 62-214186 A | 9/1987 | |
| JP | 2001-354986 A | 12/2001 | |
| JP | 2003-239090 A | 8/2003 | |
| JP | 2004-204185 A | 7/2004 | |
| JP | 2005-154759 A | 6/2005 | |
| JP | 2007039635 A * | 2/2007 | |
| JP | 2007-154084 A | 6/2007 | |
| JP | 2007-297553 A | 11/2007 | |
| JP | 2008-13652 A | 1/2008 | |
| JP | 2009-227958 A | 10/2009 | |
| JP | 2012-180473 A | 9/2012 | |
| WO | WO 2008/004613 A1 | 1/2008 | |
| WO | WO 2009/027428 A2 | 3/2009 | |
| WO | WO 2010/023911 A1 | 3/2010 | |
| WO | WO 2012/117098 A1 | 9/2012 | |

OTHER PUBLICATIONS

Extended European Search Report dated Mar. 17, 2017 in Patent Application No. 14845678.3.
Japanese Office Action dated Aug. 23, 2016 in Patent Application No. 2013-192833 (with English Translation).
International Search Report dated Oct. 21, 2014, in PCT/JP2014/074499, filed Sep. 17, 2014.
Combined Chinese Office Action and Search Report dated Apr. 13, 2018 in Chinese Patent Application No. 201480051221.X (with English translation of Category of Cited Documents), citing documents AO and AP therein. 9 pages.
Brazilian Office Action dated Nov. 19, 2019 in Patent Application No. BR 11 2016 005148-3 (with English translation) 12 pages.

* cited by examiner

*Primary Examiner* — Taiwo Oladapo
(74) *Attorney, Agent, or Firm* — Oblon, McClelland, Maier & Neustadt, L.L.P.

(57) ABSTRACT

A grease of the invention contains a fluorine synthetic oil as a base oil and an inorganic acid salt that is at least one selected from phosphate, tungstate, sulfate and sulfite. The grease of the invention is suitably usable in a bearing, a gear and the like because of an excellent wear resistance and a low environmental burden.

18 Claims, No Drawings

GREASE

TECHNICAL FIELD

The present invention relates to a grease containing a fluorine synthetic oil as a base oil.

BACKGROUND ART

Since a so-called fluorine grease containing a fluorine synthetic oil as a base oil exhibits a poor oil solubility, various additives generally usable in a hydrocarbon lubricating agent is restrictively used to the fluorine grease. For instance, in order to impart wear resistance and an anticorrosion function to the fluorine grease, sodium nitrite (i.e., an inorganic passivation agent) has been used for a long time. However, sodium nitrite is known for reacting with a secondary amine under acid conditions to generate N-nitrosamine. Since N-nitrosamine is an environmentally burdening substance, an additive capable of functioning in place of sodium nitrite has been desired.

In such circumstances, a fluorine grease containing at least one of an aliphatic dicarboxylic acid metal salt, a monoamide monocarboxylic acid metal salt or a monoester carboxylic acid metal salt as a thickener has been proposed (see, for instance, Patent Literature 1). Patent Literature 1 discloses that this fluorine grease exhibits excellent wear resistance, leakage resistance and detergency and producible at a satisfactory cost. Moreover, a fluorine grease containing polytetrafluoroethylene as the thickener and a fatty acid metal salt (e.g., sebacic acid metal salt) as a rust inhibitor has been proposed (see, for instance, Patent Literature 2). Patent Literature 2 discloses that the fluorine grease exhibits excellent evaporation characteristic and rust resistance.

CITATION LIST

Patent Literature(s)

Patent Literature 1: JP-A-2001-354986
Patent Literature 2: JP-A-2008-013652

SUMMARY OF THE INVENTION

Problems to be Solved by the Invention

However, even the fluorine greases of Patent Literatures 1 and 2 do not necessarily exhibit a sufficient wear resistance. Moreover, since the fluorine grease of Patent Literature 2 contains an organic acid metal salt, heat resistance is not sufficient.

An object of the invention is to provide a fluorine grease exhibiting rust resistance, an excellent wear resistance and a low environmental burden.

Means for Solving the Problems

In order to solve the above problem, the following grease is provided according to aspects of the invention.
(1) According to an aspect of the invention, a grease contains: a fluorine synthetic oil as a base oil; and an inorganic acid salt that is at least one selected from phosphate, tungstate, sulfate and sulfite.
(2) In the above arrangement, the inorganic acid salt is an alkali metal salt.
(3) In the above arrangement, the phosphate is at least one of orthophosphate, hydrogenphosphate, polyphosphate, phosphite and methaphosphate.
(4) According to another aspect of the invention, a grease contains: a fluorine synthetic oil as a base oil; and an inorganic acid salt, in which the inorganic acid salt is phosphate and tungstate.
(5) In the above arrangement, the phosphate is at least one of hydrogenphosphate, pyrophosphate, tripolyphosphate and tetrapolyphosphate.
(6) In the above arrangement, the inorganic acid salt is salts of the same alkali metal.
(7) In the above arrangement, the inorganic acid salt is a sodium salt.
(8) In the above arrangement, a content of the inorganic acid salt is in a range from 0.5 mass % to 15 mass % in a total amount of the grease.
(9) In the above arrangement, the fluorine synthetic oil is a perfluoroalkylpolyether oil.

According to the above aspects of the invention, a fluorine grease exhibiting an excellent wear resistance can be provided.

DESCRIPTION OF EMBODIMENT(S)

A grease according to an exemplary embodiment (hereinafter, also referred to as "the present grease") contains a fluorine synthetic oil as a base oil and at least one inorganic acid salt selected from phosphate, tungstate, sulfate and sulfite. The exemplary embodiment of the invention will be described below in detail.

The present grease is a so-called fluorine grease. Any fluorine synthetic oil is usable as the base oil as long as containing fluorine in a molecule and usable as a lubricating oil. Particularly, a perfluoroalkylpolyether oil that is inert and has a low vapor pressure is suitably usable as the base oil. The perfluoroalkylpolyether oil preferably has a kinematic viscosity at 40 degrees C. in a range from 5 $mm^2/s$ to 1000 $mm^2/s$, more preferably from 50 $mm^2/s$ to 1000 $mm^2/s$, further preferably from 70 $mm^2/s$ to 800 $mm^2/s$. When the kinematic viscosity at 40 degrees C. falls within the above range, a balance between a pour point and an evaporation amount is excellent.

A ratio of the base oil in the present grease is preferably in a range from 50 mass % to 98 mass %, more preferably from 65 mass % to 85 mass % in a total amount of the grease.

Any thickener is usable in the present grease as long as being a solid dispersible in the fluorine synthetic oil to turn the fluorine synthetic oil into a grease state (semi-solid state). Examples of the thickener include: a fluorine resin represented by polytetrafluoroethylene and polytrifluoroethylene; a metal soap represented by Li soap, Ca soap and Al soap; a complexed soap represented by Li complexed soap, Ca complexed soap and Al complexed soap; an urea compound; an urethane compound; bentonite; a silicon compound; sodium terephthalate; melamine cyanurate; and carbon black. Particularly, polytetrafluoroethylene, silica, melamine cyanurate, carbon black and the like are preferable.

A ratio of the thickener in the present grease is preferably in a range from 1 mass % to 49 mass %, further preferably from 10 mass % to 40 mass % in the total amount of the grease. When the ratio of the thickener is 1 mass or more, the present grease has a sufficient fluidity. When the ratio of the thickener is 49 mass % or less, the present grease is not excessively hard. In other words, when the ratio of the thickener falls within the above range, a balance between the fluidity and hardness (softness) is excellent.

The present grease contains at least one inorganic acid salt selected from phosphate, tungstate, sulfate and sulfite as the inorganic acid salt. The inorganic acid salt effectively improves wear resistance.

Preferable examples of the above-described phosphate include orthophosphate, hydrogenphosphate, polyphosphate, phosphite and methaphosphate. Examples of polyphosphate include pyrophosphate (diphosphate), tripolyphosphate and tetrapolyphosphate. Among the above phosphate, hydrogenphosphate, pyrophosphate (diphosphate), tripolyphosphate and tetrapolyphosphate are preferable in view of effects resulting therefrom.

Examples of tungstate include lithium tungstate, sodium tungstate, potassium tungstate, rubidium tungstate, cesium tungstate, magnesium tungstate, calcium tungstate, strontium tungstate, barium tungstate, zirconium tungstate, manganese tungstate, iron tungstate, cobalt tungstate, nickel tungstate, copper tungstate, silver tungstate, zinc tungstate, cadmium tungstate and ammonium tungstate.

Combined use of the above-described phosphate and tungstate can significantly improve wear resistance by synergistic effects. At that time, phosphate is preferably hydrogenphosphate, pyrophosphate (diphosphate), tripolyphosphate and tetrapolyphosphate. Moreover, both of the above-described phosphate and tungstate are preferably an alkali metal salt, more preferably a sodium salt.

Examples of sulfate include lithium sulfate, sodium sulfate, potassium sulfate, rubidium sulfate, cesium sulfate, magnesium sulfate, calcium sulfate and ammonium sulfate.

Examples of sulfite include lithium sulfite, sodium sulfite, potassium sulfite, rubidium sulfite, cesium sulfite, magnesium sulfite, calcium sulfite and ammonium sulfite.

Among the above inorganic acid salt, an alkali metal salt is preferable in view of the effects resulting therefrom. The alkali metal salt is preferably a sodium salt, a potassium salt and a lithium salt, among which the sodium salt is particularly preferable.

A content of the above inorganic acid salt is preferably in a range from 0.5 mass % to 15 mass %, more preferably from 0.8 mass % to 12 mass %, further preferably from 2 mass % to 8 mass %.

When pyrophosphate, particularly, sodium pyrophosphate is used as the inorganic acid salt, a content of sodium pyrophosphate is preferably in a range from 0.8 mass % to 8 mass %. When tungstate, particularly, sodium tungstate is used as the inorganic acid salt, a content of sodium tungstate is preferably in a range from 2 mass % to 12 mass %.

Further, additives generally added to a grease, examples of which include an antioxidant, a rust inhibitor, an anticorrosive agent, an extreme pressure agent and an oiliness agent, may be added as needed to the present grease.

Examples of the antioxidant include: an aminic antioxidant such as alkyldiphenylamine (in which an alkyl group preferably has 4 to 20 carbon atoms), triphenylamine, phenyl-α-naphthylamine, phenothiazine, alkylated phenyl-α-naphthylamine, phenothiazine and alkylated phenothiazine; a phenolic antioxidant such as 2,6-di-tert-butyl-4-methylphenol and 4,4'-methylenebis(2,6-di-tert-butylphenol); and a sulfuric antioxidant. One of the antioxidants may be used alone, or two or more thereof may be used in a combination.

A content of the antioxidant is not particularly limited, but is preferably in a range from 0.05 mass % to 7 mass % in the total amount of the grease.

Examples of the rust inhibitor include fatty acid, fatty acid soap, fatty acid amine salt, alkyl sulfonate, oxidized paraffin and polyoxyalkylether.

A content of the rust inhibitor is not particularly limited, but is preferably in a range from 0.1 mass % to 2 mass % in the total amount of the grease.

Examples of the anticorrosive agent include various compounds such as a benzotriazole compound, a tolyltriazole compound, a thiadiazole compound and an imidazole compound. One of the anticorrosive agents may be used alone, or two or more thereof may be used in a combination.

A content of the anticorrosive agent is not particularly limited, but preferably in a range from 0.01 mass % to 3 mass %, more preferably from 0.01 mass % to 1 mass % in the total amount of the grease.

Examples of the extreme pressure agent include a sulfuric extreme pressure agent and a phosphoric extreme pressure agent. Examples of the sulfuric extreme pressure agent include olefin sulfide, sulfurized fat and oil, ester sulfide, thiocarbonates, dithiocarbamates and polysulfides. Examples of the phosphoric extreme pressure agent include phosphites, phosphates, phosphonate esters, and amine salts thereof or metal salts thereof. One of the extreme pressure agents may be used alone, or two or more thereof may be used in a combination.

A content of the phosphoric extreme pressure agent is not particularly limited, but is preferably in a range from 0.1 mass % to 20 mass % in the total amount of the grease.

Examples of the oiliness agent include aliphatic monocarboxylic acid, polymerized aliphatic acid, hydroxy fatty acid, aliphatic monoalcohol, aliphatic monoamine, aliphatic monocarboxylic acid amide, and a partial ester formed by polyhydric alcohol and aliphatic monocarboxylic acid. One of the oiliness agents may be used alone, or two or more thereof may be used in a combination.

A content of the oiliness agent is not particularly limited, but is preferably in a range from 0.01 mass % to 10 mass % in the total amount of the composition.

In order to manufacture (prepare) the present grease, for instance, the thickener (including a precursor), the inorganic acid salt and other necessary additives are added at the respective predetermined amounts to the fluorine synthetic oil (e.g., perfluoroalkylpolyether oil) and the obtained mixture is heated with stirring to prepare a grease. The obtained grease may be further kneaded by a three roll mill and the like as needed.

The present grease is effectively usable in a bearing (e.g., a ball bearing and a slide bearing), a gear, pin-bush, ball screw, linear guide and various sliding portions which are used at high temperatures and under severe conditions.

EXAMPLES

The invention will be described in more detail below by exemplifying examples and comparatives. It should be noted that the invention is not limited to specific description of the examples and the like.

Examples 1-14, Comparative 1-3 and Reference Examples 1-3

Each of the inorganic acid salts shown in Table 1 below was blended at a predetermined amount to prepare a test grease. Perfluoropolyether having a kinematic viscosity at 40 degrees C. of 400 $mm^2/s$ was used as the base oil. Polytetrafluoroethylene of 25 mass % was blended as the thickener.

TABLE 1

|  | Inorganic acid salt | added amount (mass %) | Diameter of wear track (mm) |
|---|---|---|---|
| Example 1 | sodium pyrophosphate | 0.9 | 0.31 |
| Example 2 | sodium pyrophosphate | 2.5 | 0.21 |
| Example 3 | sodium pyrophosphate | 5.0 | 0.24 |
| Example 4 | sodium pyrophosphate | 7.5 | 0.26 |
| Example 5 | sodium tungstate | 2.5 | 0.33 |
| Example 6 | sodium tungstate | 5.0 | 0.26 |
| Example 7 | sodium tungstate | 7.5 | 0.16 |
| Example 8 | sodium tungstate | 10.0 | 0.20 |
| Example 9 | sodium methaphosphate | 5.0 | 0.25 |
| Example 10 | sodium tripolyphosphate | 5.0 | 0.24 |
| Example 11 | sodium tetrapolyphosphate | 5.0 | 0.23 |
| Example 12 | potassium pyrophosphate | 5.0 | 0.27 |
| Example 13 | disodium hydrogenphosphate | 5.0 | 0.22 |
| Example 14 | disodium hydrogenphosphite | 5.0 | 0.23 |
| Comparative 1 | not added | 0.0 | 0.57 |
| Comparative 2 | calcium carbonate | 5.0 | 0.33 |
| Comparative 3 | sodium molybdate | 5.0 | 0.43 |
| Reference Ex. 1 | sodium nitrite | 0.9 | 0.30 |
| Reference Ex. 2 | sodium nitrite | 2.5 | 0.29 |
| Reference Ex. 3 | sodium nitrite | 5.0 | 0.29 |

Evaluation Method

After each of the test greases was coated on the disc using a ball-on-disc tester described in DIN51834, a friction test was conducted under the following conditions. An average (unit: mm) of a lengthwise diameter and a width diameter of a wear track after the elapse of 60 minutes after the start of the test was measured. The results are shown in Table 1.

Temperature: 190 degrees C.
Load: 50 N
Amplitude: 1 mm
Frequency: 50 Hz
Ball diameter: 10 mm Evaluation Results Since the present greases in Examples 1 to 14 contain the predetermined inorganic acid salts, the present greases do not burden environment and exhibit an excellent wear resistance similar to sodium nitrite in Reference Examples (entailing a large environmental burden)

The greases in Comparatives 1 to 3, which do not contain the predetermined inorganic acid salts according to the invention, exhibit a poor wear resistance.

Examples 15 to 17

Table 2 shows the evaluation results of the test greases containing both of sodium pyrophosphate and sodium tungstate, in terms of the wear resistance tested in the same manner as in the test greases shown in Table 1.

TABLE 2

|  | Inorganic acid salt (first component) | added amount (mass %) | Inorganic acid salt (second component) | added amount (mass %) | Diameter of wear track (mm) |
|---|---|---|---|---|---|
| Example 15 | sodium pyrophosphate | 2.5 | sodium tungstate | 0.9 | 0.20 |
| Example 16 | sodium pyrophosphate | 2.5 | sodium tungstate | 2.5 | 0.18 |
| Example 17 | sodium pyrophosphate | 2.5 | sodium tungstate | 5.0 | 0.23 |

Evaluation Results

As compared with Example 3 in which sodium pyrophosphate (5.0 mass %) was added alone as the inorganic acid salt and Example 6 in which sodium tungstate (5.0 mass %) was added alone as the inorganic acid salt, Example 16 with the same added amount (total amount of 5.0 mass %) showed a significantly small diameter of the wear track. Accordingly, it can be understood that the additives produce synergetic effects.

The invention claimed is:

1. A grease, comprising:
    a perfluoropolyether as a base oil;
    an inorganic acid salt that is a combination of phosphate inorganic acid salt and tungstate inorganic acid salt, wherein a content of the inorganic acid salt is in a range of from 3.4 mass % to 5.0 mass % based on a total amount of the grease and wherein the phosphate inorganic acid salt and the tungstate inorganic acid salt are an alkali metal salt, wherein a total content of the tungstate inorganic acid salt is in a range of from 0.9 mass % to 2.5 mass % based on a total amount of the grease.

2. The grease according to claim 1, wherein the alkali metal is sodium or potassium.

3. The grease according to claim 1, wherein the phosphate inorganic acid salt is at least one of an orthophosphate, a hydrogenphosphate, a polyphosphate, a phosphite and a methaphosphate.

4. The grease according to claim 1, wherein the grease comprises at least one phosphate inorganic acid salt selected from the group consisting of hydrogenphosphate, a pyrophosphate, a tripolyphosphate and a tetrapolyphosphate.

5. The grease according to claim 1, wherein the phosphate inorganic acid salt and the tungstate inorganic acid salt are salts of the same metal.

6. The grease according to claim 1, wherein the phosphate inorganic acid salt and the tungstate inorganic acid salt are sodium salts.

7. The grease according to claim 1, further comprising:
    a solid thicker selected from the group consisting of a polytetrafluoroethylene and a polytrifluoroethylene.

8. The grease according to claim 7, wherein the solid thickener is present in an amount of from 10 mass % to 40 mass % based on the total amount of the grease.

9. The grease according to claim 1, wherein the perfluoropolyether present in an amount of from 50 mass % to 98 mass % based on the total amount of the grease.

10. The grease according to claim 1, wherein the perfluoropolyether is present in an amount of from 65 mass % to 85 mass % based on the total amount of the grease.

11. The grease according to claim 1, wherein the tungstate inorganic acid salt is sodium tungstate and the phosphate inorganic acid salt is sodium pyrophosphate.

12. The grease according to claim 1, having a diameter of wear track of 0.23 mm or less measured as an average (unit:mm) of a lengthwise diameter and a width diameter using a ball-on-disc tester described in DIN51834 under the following conditions: an elapse of 60 minutes; a temperature of 190 degrees C.; a load of 50 N; an amplitude of 1 mm; a frequency of 50 Hz; and a ball diameter of 10 mm.

13. The grease according to claim 1, wherein the grease further comprises a solid thickener, the solid thickener being selected from the group consisting of a polytetrafluoroethylene, a polytrifluoroethylene, a Li soap, a Ca soap, an Al soap, a Li complexed soap, a Ca complexed soap, an Al complexed soap, a urea compound, a urethane compound, a bentonite, a silicon compound and a carbon black.

14. The grease according to claim 7, wherein the solid thickener is present in the grease in an amount effective to turn the perfluoropolyether into a semi-solid grease state.

15. The grease according to claim 1, wherein the inorganic acid salt is a combination of sodium pyrophosphate and sodium tungstate.

16. The grease according to claim 1, wherein the phosphate inorganic acid salt and the tungstate inorganic acid salt are sodium salts.

17. The grease according to claim 16, wherein the phosphate in said phosphate inorganic acid salt is selected from the group consisting of hydrogenphosphate, a pyrophosphate, a tripolyphosphate and a tetrapolyphosphate.

18. The grease according to claim 16, wherein the phosphate in said phosphate inorganic acid salt is selected from the group consisting of a pyrophosphate, a tripolyphosphate and a tetrapolyphosphate.

* * * * *